US012222687B2

(12) United States Patent
Keating et al.

(10) Patent No.: US 12,222,687 B2
(45) Date of Patent: *Feb. 11, 2025

(54) CONTROLLING POWER DISTRIBUTION SERVING AN AGGREGATE OF ELECTRICAL LOADS BEHIND A METER

(71) Applicant: DemandQ, Inc., Waltham, MA (US)

(72) Inventors: Bryan Keating, Watertown, MA (US); Jonathan Stahl, Melrose, MA (US); Gerardo Ventura, Wellesley, MA (US); Sital Khatiwada, Woburn, MA (US)

(73) Assignee: DemandQ, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,495

(22) Filed: Oct. 31, 2023

(65) Prior Publication Data

US 2024/0061381 A1  Feb. 22, 2024

Related U.S. Application Data

(63) Continuation of application No. 17/535,123, filed on Nov. 24, 2021, now Pat. No. 11,803,164.

(60) Provisional application No. 63/119,910, filed on Dec. 1, 2020.

(51) Int. Cl.
*G05B 13/02* (2006.01)
*B60L 53/63* (2019.01)
*G06Q 50/06* (2024.01)
*H02J 3/00* (2006.01)

(52) U.S. Cl.
CPC ............ *G05B 13/024* (2013.01); *B60L 53/63* (2019.02); *G06Q 50/06* (2013.01); *H02J 3/003* (2020.01); *Y04S 20/222* (2013.01)

(58) Field of Classification Search
CPC ....... G05B 13/024; G06Q 50/06; H02J 3/003; H02J 3/004; H02J 3/322; H02J 3/381; H02J 3/48; B60L 53/51; B60L 53/62; B60L 53/63; B60L 53/305; B60L 2260/54; Y04S 20/222; Y02T 10/70; Y02T 10/7072; Y02T 90/12; Y02T 90/16; Y02T 90/167; Y02B 70/30; Y02B 70/3225

See application file for complete search history.

(56) References Cited

U.S. PATENT DOCUMENTS

| | | | |
|---|---|---|---|
| 8,219,258 B1 * | 7/2012 | Almeida | G05B 15/02 700/297 |
| 10,065,519 B1 * | 9/2018 | Appelbaum | B60L 58/10 |
| 10,605,474 B2 * | 3/2020 | Malcolm | F24F 11/54 |
| 11,046,201 B2 * | 6/2021 | Mondello | B60L 53/66 |
| 11,387,651 B2 * | 7/2022 | Samaan | H02J 3/381 |
| 11,803,164 B2 * | 10/2023 | Keating | H02J 3/48 |
| 2012/0001487 A1 * | 1/2012 | Pessina | H05B 47/11 307/31 |

(Continued)

*Primary Examiner* — M. N. Von Buhr
(74) *Attorney, Agent, or Firm* — David H. Judson (57) ABSTRACT

A method, apparatus and system are provided to coordinate, manage, and optimize the electrical loads across all subsystems behind a given meter. In this approach, which is sometimes referred to herein as intelligent demand optimization, the optimized capacity needs of each subsystem are assessed in real-time, along with the available capacity of the meter and the current billing period peak. Power is then distributed dynamically to each subsystem to reduce the overall peak.

12 Claims, 4 Drawing Sheets

(56) References Cited

U.S. PATENT DOCUMENTS

| | | | |
|---|---|---|---|
| 2012/0245750 A1* | 9/2012 | Paul | H02J 3/003 |
| | | | 700/291 |
| 2012/0277925 A1* | 11/2012 | Almeida | G05B 15/02 |
| | | | 700/291 |
| 2014/0350744 A1* | 11/2014 | Almeida, Jr. | G06N 7/01 |
| | | | 700/297 |
| 2017/0110895 A1* | 4/2017 | Low | B60L 53/63 |
| 2017/0167742 A1* | 6/2017 | Radovanovic | F24F 11/70 |
| 2017/0256908 A1* | 9/2017 | Lehmann | H01S 5/0085 |
| 2017/0283024 A1* | 10/2017 | Converse | B63H 21/21 |
| 2019/0184850 A1* | 6/2019 | Lee | B60L 53/66 |
| 2020/0254896 A1* | 8/2020 | Lee | B60L 53/68 |

* cited by examiner

CONTROLLING POWER DISTRIBUTION SERVING AN AGGREGATE OF ELECTRICAL LOADS BEHIND A METER

BACKGROUND

Technical Field

This application relates generally to energy management systems.

Background of the Related Art

Power distribution and energy management systems are well-known. In a typical installation wherein different types of electrical loads share a single electrical meter, e.g., a building that includes HVAC equipment inside and a set of electric vehicle (EV) charging stations outside, the occurrence of coincident peaks is a random event. External factors, such as unseasonably high outdoor temperatures or unplanned arrivals of electric vehicles, places additional power demands on the electrical subsystems, which invariably creates the highest electrical peaks during a billing period. It is also known that predictive modeling can be used to optimize the operation of electrical loads within a subsystem and effectively reduce coincident peaks. An optimized subsystem, however, has no knowledge of the electrical needs and demands of the other subsystems attached to the same meter. Without a comprehensive view of the meter, there is no coordination of electrical loads across all subsystems, and coincident peaks become more common and reach higher levels. For example, a demand optimized building may require 185 kW on hot summer day. At the same time, a demand optimized charging station on the same meter may allow 300 kW for charging. While each of these subsystems are optimized to reduce demand, the peak power measured at the meter is the aggregation of these subsystem loads: 185 kW+300 kW=485 kW. The cooling needs of the building are fixed, and are required to maintain comfort; however, vehicle charging is flexible. Therefore, it may be possible to defer or reduce charging if a maximum capacity were imposed on the charging station.

Current energy management systems do not provide adequate solutions for this problem.

BRIEF SUMMARY

According to this disclosure, a method, apparatus and system are provided to coordinate, manage, and optimize the electrical loads across all subsystems behind a given meter. In this approach, which is sometimes referred to herein as intelligent demand optimization, the optimized capacity needs of each subsystem are assessed in real-time, along with the available capacity of the meter and the current billing period peak. Power is then distributed dynamically to each subsystem to reduce the overall peak. Thus, for example, and in the scenario described above, if it were determined that the charging station is limited to 250 kW, the overall coincident peak for all subsystems would be reduced by 10%.

According to a more specific aspect, a method of controlling distribution of power serving an aggregate of electric loads contained within defined subsystems associated with a facility is provided. The subsystems typically comprise loads that exhibit cycling and non-cycling operations, i.e., varying states of power utilization. Example subsystems include buildings, EV charging stations, power storage solutions, distributed energy resources (DER), and the like. It is assumed that all of the subsystems share the same meter. A given load is sometimes referred to herein as an electrical access point. In this operating environment, power distribution to the loads is enabled by a queueing system that accounts for a varying set of operating states associated with the set of access points when viewed collectively, and wherein as an operating state of the set of access points changes, access to a power supply for the facility is selectively queued or de-queued. In one embodiment, the method includes generating a forecast of a net peak load of each subsystem. A forecast of a potential load of each cycling load within each subsystem is also generated. The forecast of net peak load and the forecast of potential cycling peak load are then used to generating an operating plan for the set of electrical access points for the aggregate of all loads of the subsystems. As the queueing system manages power distribution to the set of electrical access points, the set of access points are then controlled according to the operating plan to ensure that demand is optimized for the facility as a whole.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

The following is a glossary of terms.

An "electrical subsystem" is a submetered collection of electrical loads to service a logical infrastructure. Submetering can be achieved via an actual meter on the circuit, or calculated virtually in software. Example subsystems include: buildings (such as a retail store or a warehouse), electric (EV) charging stations, power storage solutions (such as batteries), Distributed Energy Resources (DER), and others. Typically, a building subsystem comprises a set of remotely-controllable fixed assets that are independently or collectively governed by a control device (e.g., a thermostat, a network control device/router, a building management system, etc.). An EV charging subsystem, in contrast, typically comprises a set of remotely-controllable variable and volatile assets with independent power access points independently or collectively governed by a control system (e.g., a switch/breaker or rheostat, a network control device/router, a charge management system, etc.).

As noted above, and in the context of this disclosure, electrical subsystems associated with a facility share the same meter.

A "subsystem capacity limiter (SCL)" is a hardware and/or software component that gates, or limits, the amount of power (kW) used by an electrical subsystem.

A "load history" is a recording of an operational state and behavior of cycling and non-cycling loads within a subsystem.

The notion of "predictive modeling" refers to a process or technique that assesses the power needs of electrical loads, along with constraints such as available power, weather, schedules, tariffs, market conditions, and priorities, and forecasts the target power requirements for those electrical loads.

A "control optimization component" is a controller that controls cycling and non-cycling electrical loads by forecasting the required power of each and all loads within a subsystem and the aggregate of all subsystems attached to a metered power access point to optimize the operation of all underlying equipment, applying the specifications of the electrical equipment, the status of the electrical loads, and the historical operation of the equipment, so that the scale and occurrence of coincident peaks is reduced.

A "Grade of Service" (GoS) is a measure of a relationship between the forecasted power of the subsystem and the available/maximum power of the subsystem. In general, a GoS>1 indicates more power must be allocated to the subsystem to meet the operational requirements of the electrical loads.

A "Subsystem Capacity Score (SCS)" is a measure of a relationship between a maximum power capacity limit and a meter reading for a subsystem.

Figure 1:
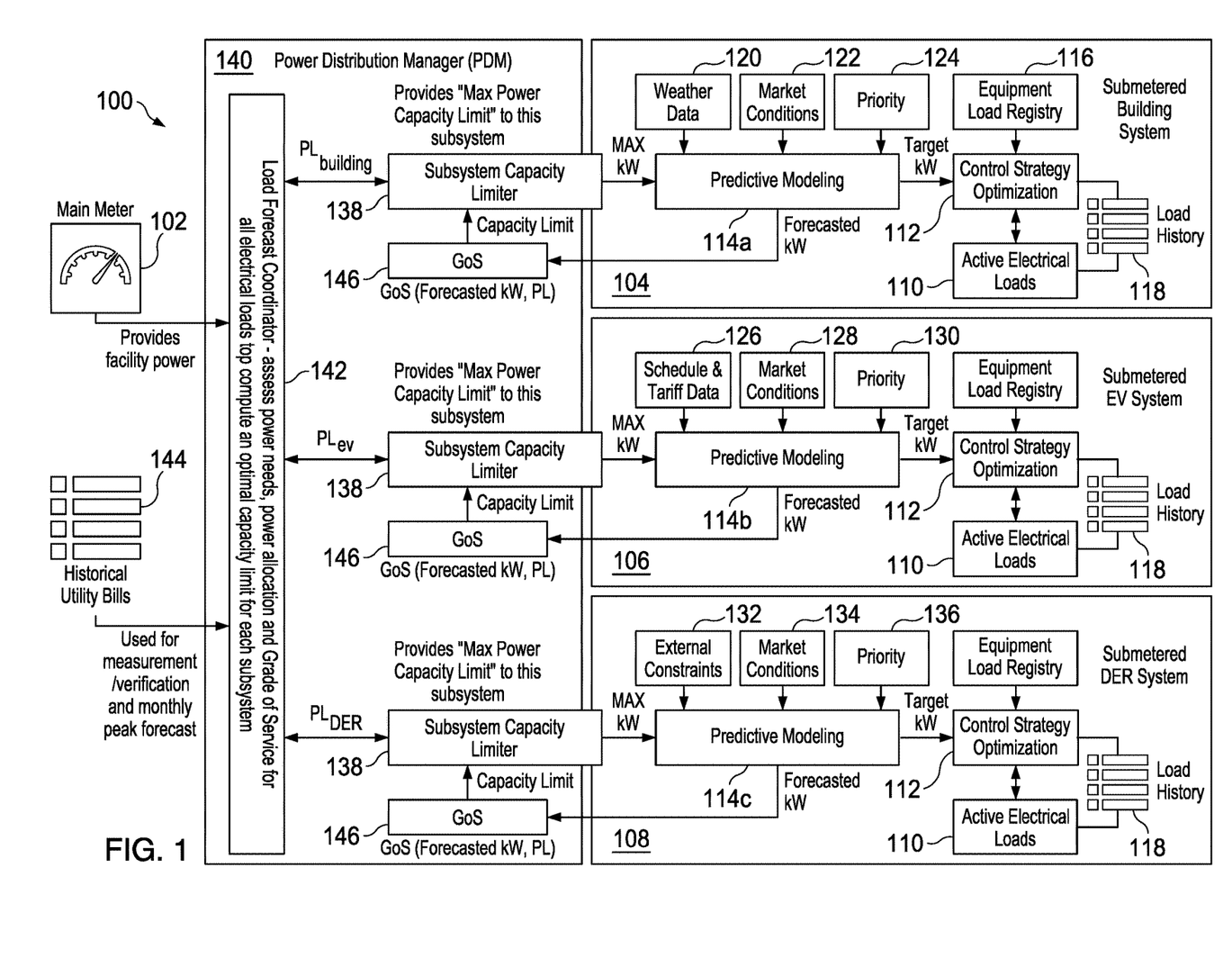
FIG. 1 is a block diagram depicting site that comprises a plurality of electrical subsystems that are controlled by an intelligent demand management system according to the techniques of this disclosure.

With the above as background, FIG. 1 depicts a power distribution control system according to the techniques of this disclosure. The system 100 is associated with a site (or facility) that includes a main meter 102 and two or more distinct subsystems, e.g., a submetered building system 104, a submetered EV system 106, and a submetered DER system 108. There is no limit to the number of distinct subsystems that may exist behind the single meter 102. As depicted, each of the subsystems has a set of one or more active electrical loads 110, which loads may be cycling and non-cycling, and that are controlled by a control optimization mechanism 112. The control optimization component 112 typically receives as inputs (i) target kW from a predictive modeling component 114a-c, information about the electric loads (e.g., type, capacity, specifications, etc.) stored in an equipment load registry 116, as well as historical load data shown as load history 118. The control optimization mechanism 112 for a particular subsystem may vary from that in another subsystem. A representative (but non-limiting) control optimization mechanism is Queued Power Access Control (QPAC™) technology, by DemandQ, Inc., of Waltham, Massachusetts. A mechanism 112 is implementation-specific and typically includes a computing platform (hardware and software) and associated control systems, devices, processes, interfaces and data.

As depicted in FIG. 1, the predictive modeling component 114 in each subsystem receives a set of inputs as well, and these input sets may differ from one another across the subsystems. Thus, for example, the predictive modeling component 114a in the building system 104 receives, as inputs, weather data 120, market conditions data 122, and priority data (for the various electrical loads in the subsystem) 124. Predictive modeling component 114b in the EV system 106 receives schedule and tariff data 126, market conditions data 128, and priority data 130. The predictive modeling component 114c in the DER system 108 receives, as inputs, external constraints data 132, market conditions data 134, and priority data 136. In addition, and as depicted, each predictive modeling component 114 also receives a control signal. This control signal is generated by a Subsystem Capacity Limiter (SCL) component 138 and in a manner that is described in detail below. The control signal represents a maximum kW for the particular subsystem that has been determine by a Power Distribution Manager (PDM) control system 140. As depicted, each SCL component 138 is controlled by a Load Forecast Coordinator (LFC) 142, which is the main operating component. LFC assesses the power needs, power allocation, and Grade of Service (GoS) for all electrical loads behind the meter 102 and computes an optimal capacity limit for each subsystem. Thus, LFC 142 computes an optimal capacity limit $PF_{building}$ for the building system 104, an optimal capacity limit $PL_{ev}$ for the EV system 106, and an optimal capacity limit $PL_{DER}$ for the DER system 108. As also depicted, LFC 142 receives as inputs the facility power (from the main meter 102), and historical utility data (e.g., utility bills) 144, which data is used for measurement/verification, and for monthly peak forecast generation.

According to this disclosure, the various components depicted in FIG. 1 provide for a feedback loop where the power needs of the electrical subsystems 104, 106 and 108 are assessed against one another based on their calculated Grade of Service (GoS) as identified by GoS component 146. In operation, and as will be described, power capacity limit(s) for the subsystem(s) are recalculated, preferably until GoS converges ≤1 for all subsystems. The following provides a detailed description of this operation.

As noted above, each electrical subsystem (i.e., building 102, charging station 104, etc.) contains a predictive modeling capability 114 along with an optimized control mechanism 112 to execute the operation of the electrical loads within the target capacity. Preferably, the electrical subsystems are submetered (virtually or otherwise) to provide precise levels of optimization. The predictive modeling 114 typically utilizes one or more inputs, e.g., external constraints that are applicable to that system (e.g., weather data for buildings, schedule data for electric vehicles, etc.). Additionally, the modeling preferably takes into consideration market conditions (such as time of use rates or demand response commitments), as well as the relative prioritization of its subsystem's power needs. As also described above, the modeling for a particular subsystem preferably is further constrained by the maximum kW initially allocated to that subsystem. The result of the predictive modeling for the subsystem is a target capacity, in terms of kW, under which the overall control strategy must operate. As has also been described and depicted, the control optimization (provided by mechanism 112) for a particular subsystem directly interfaces with the cycling/non-cycling loads within the subsystem. In particular, it encapsulates the control mechanism needed to operate the electrical loads within the target capacity. As noted, the implementation of the mechanism 112 varies by type of electrical load, but it may include enabling/disabling compressors, modulating the available power at charging stations, or influencing the behavior of power inverters for battery electric storage devices. Detailed information, including operating kw capacities, of the electrical loads is required to provide optimal and effective control. This information is maintained in the equipment load registry 116 and is used by the control mechanism 112 as needed. The load history database 118 records the behavior and measurements of the associated control mechanism for subsequent analysis, trending, and display.

The Power Distribution Manager (PDM) 140 governs all electrical subsystems, preferably in real-time, using the Load Forecast Coordinator (LFC) 112. LFC typically is implemented as software, executing in one or more physical processors. LFC (the PDM algorithm) applies data that includes the maximum power available as specified by the electric utility supplying power to each endpoint meter, and the maximum monthly peak power as measured across multiple electric utility billing periods at each endpoint meter. Using the Load Forecast Coordinator (LFC) 112, the Subsystem Capacity Limiter(s) 138, and Grade of Service 146, the PDM 140 computes and distributes power constraints to each subsystem 102, 104, 106 to optimize power usage and reduce billing period demand peaks. As previously described, the Subsystem Capacity Limiter (SCL) 138 constrains the power capacity used by its associated electrical subsystem. The SCL is a hardware and/or software component that restricts power to the subsystem, and it also provides a power cap for the predictive modeling component to which it is associated. Although FIG. 1 depicts three (3) distinct SCLs, this is not a requirement, as a single SCL that generates the distinct outputs may be used. In the case of certain DER systems (e.g., solar or V2G), the power limit for the SCL may be negative, indicating that power is being generated/produced by the subsystem, and being made available to the PDM. The GoS component 146 assesses the currently forecasted power at the subsystem, along with its allocated maximum power, and in response scores the power needs of the subsystem. As a rule, a GoS score >1.0 suggests that the PDM may be under-allocating power to the subsystem. The GoS component 146 acts as a feedback mechanism between the subsystem's forecasted needs and the Load Forecast Coordinator 112.

As noted above, the Load Forecast Coordinator (LFC) 112 apportions the capacity limits for each of the subsystems. In particular, and using the GoS score from each subsystem, the current billing period peak, and the facility power, the LFC re-computes power to the subsystems until the GoS score converges to less than or equal to 1.0 for all subsystems. When the LFC arrives at GoS≤1 (or some other pre-configured, pre-determined or otherwise optimal) for all subsystems, the power capacity limit is assigned to the SCL(s).

More formally, a capacity limit for the site is defined as:

$$P_{MM} \le P_{MM_{max}} \ni P_{MM} = \sum_{i=1}^{n} P_{L_n}$$

A peak load for the billing period is $P_{MM_{max}}$. $P_{MM_{max}}$ defines a maximum load constraint on the site that, in order to ensure savings compared to past billing cycles for the specified month, is not to be exceeded. However, $P_{MM_{max}}$ can be exceeded for the site if necessary for subsystems to operate during high demand conditions. $P_{MM}$ is a current main meter reading for the site, and it is computed as a summation of a maximum power capacity limit for each subsystem, $P_{L_n}$. The total number of subsystems in the site is denoted as n.

The GoS is the ratio between the forecasted kW and the subsystem maximum power capacity limit for a given subsystem:

$$GoS_n = \frac{F_{L_n}}{P_{L_n}}$$

where $F_{L_n}$ is the forecasted power for the given subsystem.

A subsystem capacity score, SCS, is defined as:

$$SCS_n = \frac{P_{L_n}}{P_{MM}}$$

In cases where one or more subsystems' GoS>1, a required power, $P_{req}$, to drive all systems back to GoS≤1 is computed. In such case, power from subsystems whose GoS≤1 are leveraged to meet the power requirements. To appropriately reroute available capacity from subsystems whose GoS≤1 to meet the required kW, the SCS for each subsystem whose GoS≤1 are summed, which is defined as a reallocation weight, $W_R$:

$$W_R \le \Sigma SCS_{n(GoS \le 1)}$$

The available capacity from a subsystem that can be rerouted towards the required power is then calculated as:

$$P_{rr_{n(GoS \le 1)}} = P_{req} \frac{SCS_{n(GoS \le 1)}}{\sum SCR_{n(GoS \le 1)}}$$

Conditions where rerouted powers from subsystems are not able to drive all GoS≤1 require that the $P_{MM_{max}}$ constraint be increased by the remaining kW amount to meet site demand requirements. This condition occurs when the sum of $P_{rr_n (GoS \le 1)}$ for all subsystems whose GoS≤1 is less than $P_{req}$:

$$\Sigma P_{rr_{n(GoS \le 1)}} < P_{req}.$$

Figure 2:
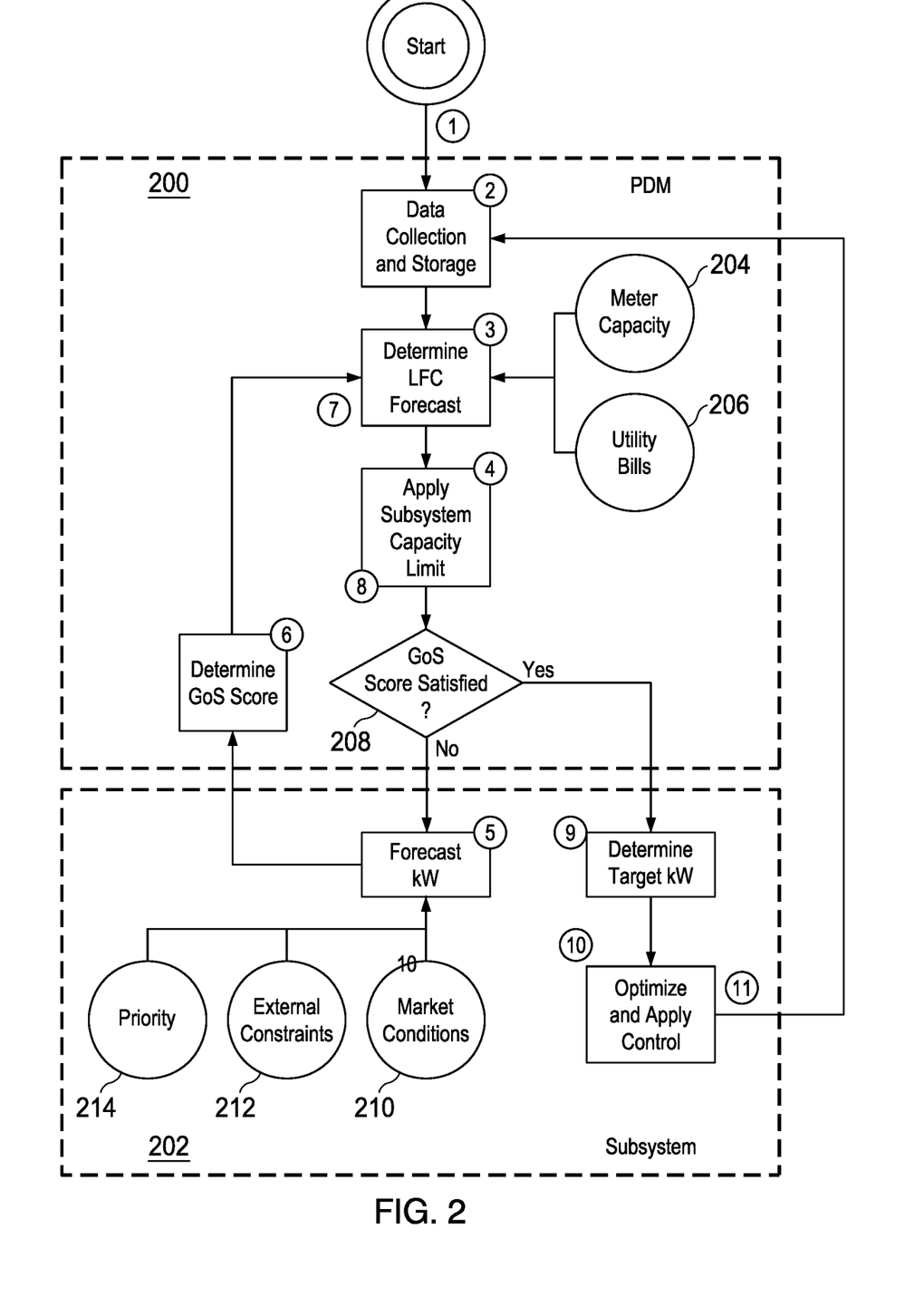
FIG. 2 is process flow depicting the operations of the Power Distribution Manager (PDM) component with respect to a particular subsystem.

With the above as background, FIG. 2 depicts a preferred operating process according to the techniques of this disclosure. This process flow is separated into two (2) portions: the PDM operations 200, and the operations associated with a representative subsystem 202. Those skilled in the art will appreciate that the subsystem operations are carried out for each of the subsystems. Preferably, the operations depicted in FIG. 2 operate continuously. The process begins at step (1) wherein the various components that provide submetering capability to each subsystem are installed (if needed) and otherwise provisioned/configured for the intelligent demand operations. At step (2), the process initiates by collecting and storing data that will be used for the computations and control functions. At step (3), the Load Forecast Controller forecasts the peak load for an applicable billing period, e.g., using operational measured data 204 and historical utility bills 206. At step (4), the power forecasts (PL) are submitted to the Subsystem Capacity Limiter(s) as starting points for maximum subsystem power. A test is then performed at step 208 to determine whether the GoS score (for the particular subsystem depicted) is satisfied. If the outcome of the test at step 208 indicates that the GoS score for the subsystem is not satisfied, control moves to step (5), wherein the predictive modeling component within the subsystem forecasts the subsystem kW using the assigned power limit, current market conditions 210, external constraints 212 relevant to the subsystem, and the subsystem priority 214. The subsystem kW forecast is then fed back to the Grade of Service component for scoring the capacity limit of the subsystem, as indicated at step (6). At step (7), LFC then gathers the GoS score for all subsystems for analysis and calculates an optimal power distribution limit for each subsystem. Thus, and as depicted, the PDM 200 manages the analysis and feedback loop to the Load Forecast Controller The process continues until all GoS scores converge to less than 1.0, or until an optimal distribution if achieved if GoS≤1 is not feasible. At step (8), the power limit is submitted to the SCL for use by the subsystem. At this point the outcome of the test at step 208 is positive. Thus, and at step (9), the subsystem's predictive modeling picks up the maximum capacity and calculates a target kW that is within the constraints of the maximum capacity of the system. At step (10), the control optimization mechanism within (or otherwise associated with) the subsystem determines an execution strategy such that the electrical loads achieve their objective while operation within the target kW for the subsystem. At (11) the control optimization mechanism stores its operational behavior to the load history database, The process then repeats continuously from step (2).

As noted above, the particular nature and type of the control optimization mechanism (and its associated control optimization strategy) for a particular subsystem will be implementation-specific.

Figure 3:
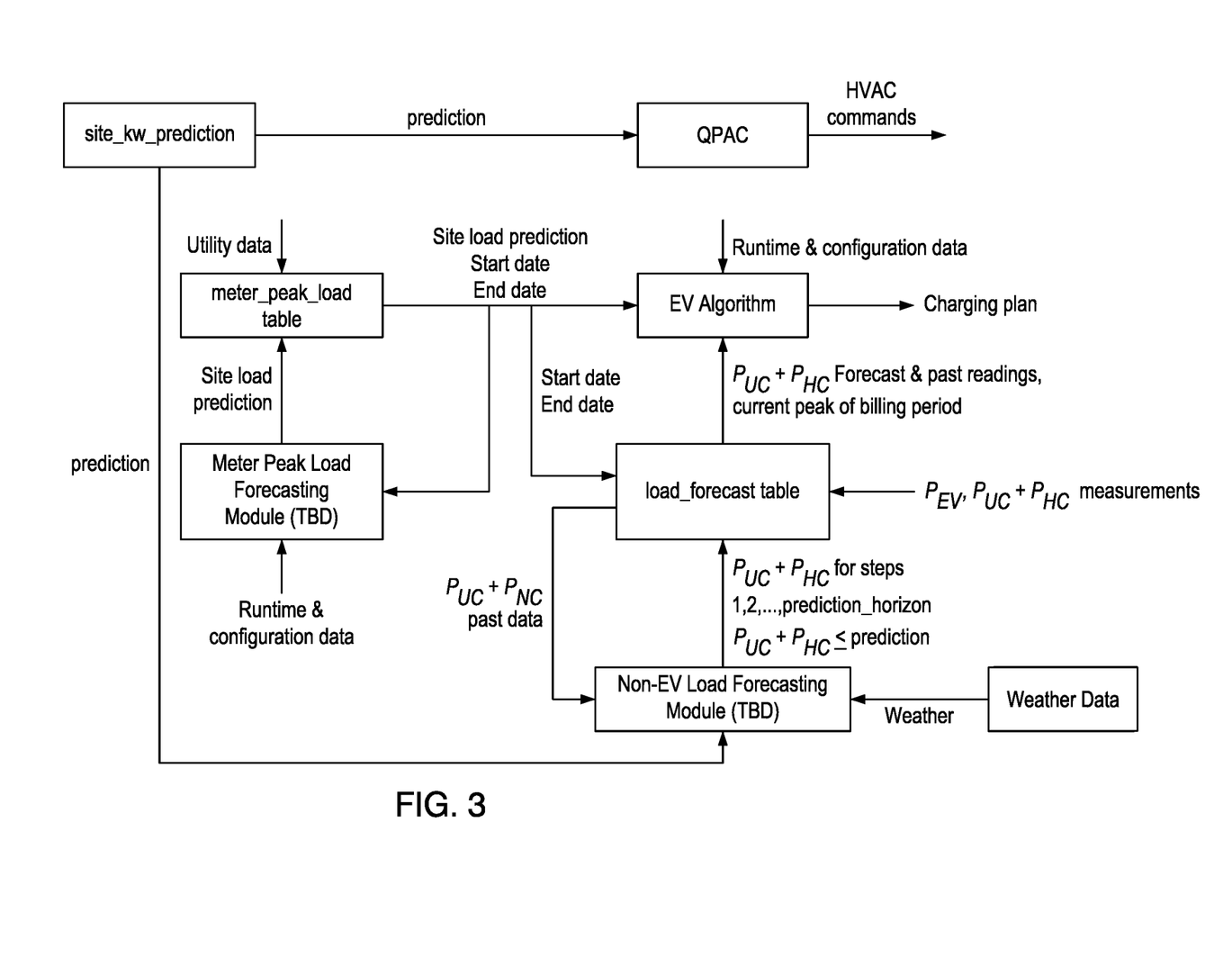
FIG. 3 illustrates an example embodiment including the integration of a building subsystem and an EV charging subsystem according to the techniques of this disclosure.

FIG. 3 depicts an example embodiment involving distribution of power for a facility (e.g., a building) serving both EV and non-EV load. It is assumed that EV chargers (the EV subsystem) following an external charging plan draw $P_{EV}$. A mix of cooling/heating equipment (the building subsystem) acting on load control signals draw $P_{CH}$. All other loads draw $P_{UC}$. By conservation of energy, the following must be true: $P_{MM} \ P_{EV}+P_{CH}+P_{UC}$. The main transformer serves a maximum load of $\overline{P}_{MM}$. The site's EV and HVAC controllers read $P_{MM}$ and $P_{EV}$, which come from various sources (e.g., EV load is determined from EV submeter reading, and the sum of EVSE pilot current signals multiplied by measured voltage or known service voltage; main meter load is determined from real-time main meter reading; non-EV load is determined from HVAC submeter reading for $P_{CH}$ and $P_{UC}=P_{MM}-P_{EV}-P_{CH}$. The sum of $P_{CH}$ and $P_{UC}$ is measured.

In this example, it is assumed that EV charging load is a preferred demand control resource over cooling and heating loads for the following reasons: EVSE power consumption is measured; by contrast, HVAC power consumption estimates come from a datasheet that may not reflect true equipment behavior. Also, typically EV chargers are more responsive to control inputs and are not subject to on/off time constraints. Further, EV batteries typically are easier to model than building temperatures, and it is assumed that EV charging users care about an EV's state of charge only at departure. By contrast, indoor temperature is very important and observed by occupants at all times. Non-EV load often can be a significant fraction of total load. As a preferred demand control resource, preferably the EV charging algorithm adapts to non-EV load fluctuations. In addition, oversubscription of the main transformer or electrical panels and constraints on rate of change in charging power may be considered.

FIG. 3 in particular depicts an EV algorithm and coordination with a queueing system-based controller used for the building subsystem. Preferably, every T minutes (1≤T≤5) or at every plug in or disconnect event, the algorithm minimizes electricity cost: ([energy used]*[cost of energy per unit time]+([demand]−maximum ([previously recorded demand], [predicted site demand]))*[demand charge], subject to the following limits: EVSE power is between 0 and the minimum of ([max EV charging power], [max EVSE power]); [sum of evse power at any time] is less than or equal to [facility limit]−[forecasted non-EV load]; states of charge (function of charging rates and charging efficiency) are at target levels by the desired departure time; the rate of change in charging current at an EVSE is less than or equal to a maximum rate (specified in EVSE equipment table); and 15 minute moving average [non-EV load]+[EV load] is less than or equal to [demand]. To solve the optimization problem, a cost function requires a forecast of the non-EV load and a prediction of the peak load. The table below shows a representative load_forecast table schema, which also stores site runtime data. Preferably, there is one such table for each main meter. For rows corresponding to times in the past, rows of non-EV load non_ev_kw and EV load ev_kw contain true measured values. Preferably, future non_ev_kw values are populated with forecasts, where the number of rows corresponds to the optimization horizon. Future values of ev_kw values preferably are left blank.

| load_forecast table schema. | | |
|---|---|---|
| Timestamp | non_ev_kw | ev_kw |
| timestamp | double(10, 1) | double(10, 1) |

The table below shows a representative schema for the meter_peak_load table, which contains past maximum demand values for previous bill months and a peak load prediction, bill start date, and bill end date for the current bill month. Predicted peak load for a given meter id typically originate from analysis of historical data.

| meter_peak_load table schema. | | | |
|---|---|---|---|
| meter_id | service_begin_date | service_end_date | peak_load |
| tinyint(4) | timestamp | timestamp | double(10, 1) |

FIG. 3 illustrates one data flow among a building control optimization mechanism (such as DemandQ QPAC), the EV charging algorithm, a non-EV load forecasting model, and other supporting modules (as shown). Preferably, the building optimization mechanism controls HVAC load using a non-EV load prediction that is equivalent to the prediction currently used. The non-EV load control prediction model is different from the non-EV load forecasting model because the desired maximum load at the site is likely higher than the load forecast, and the EV algorithm typically requires a more granular estimate of the non-EV load for multi-step ahead optimization. Preferably, the EV algorithm is used to respond in real time to non-EV load. The Non-EV Load Forecasting Module and the Meter Peak Load Forecasting Module are configured to support the meter_peak_load and load_forecast tables as described above.

Building Subsystem:

A representative building subsystem control mechanism is described in U.S. Pat. No. 8,219,258, the subject matter of which is incorporated by reference.

EV Subsystem

Figure 4:
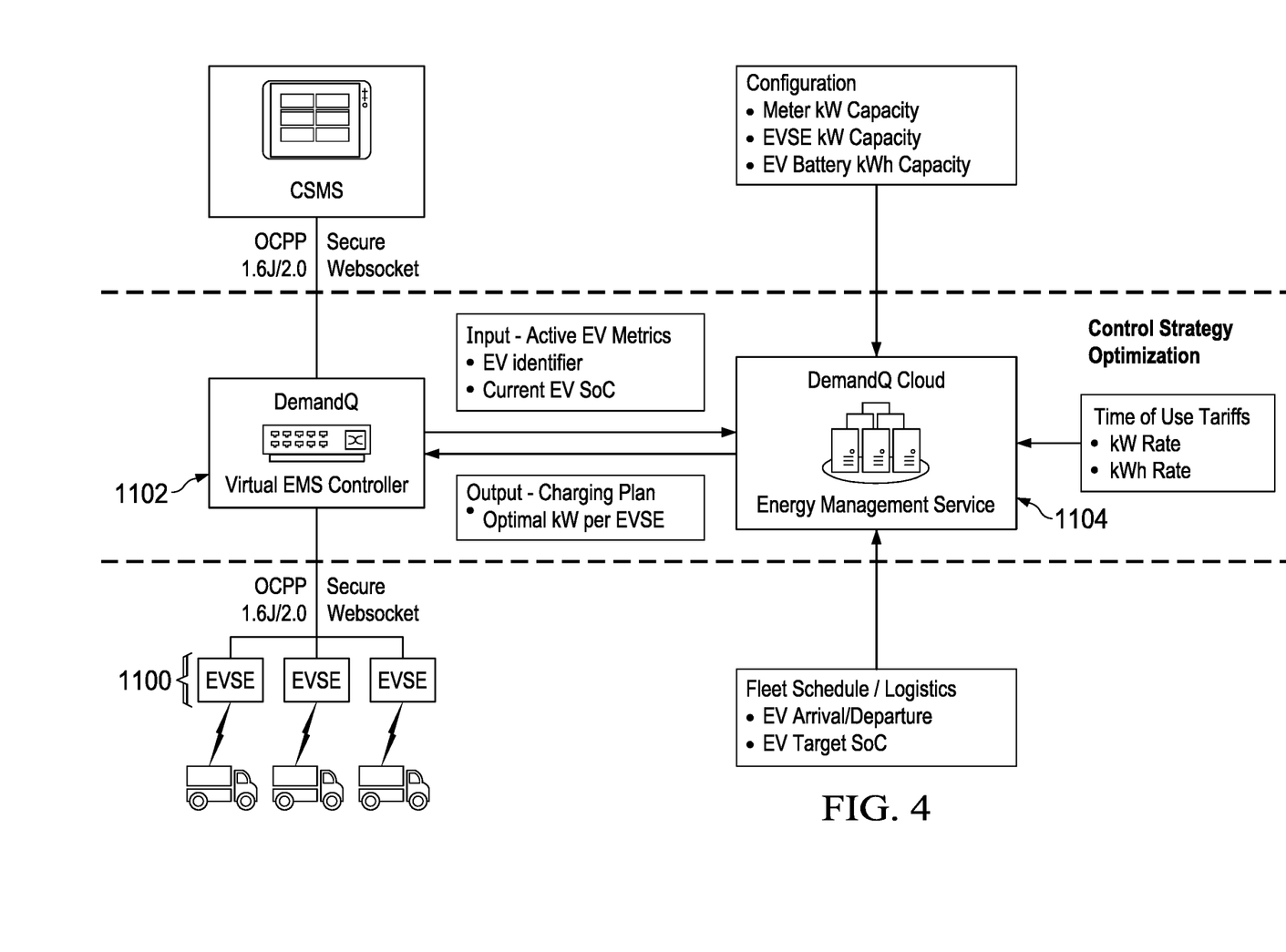
FIG. 4 illustrates a representative EV charging subsystem.

FIG. 4 depicts how the energy management system integrates with a EV charging station infrastructure, which is submetered EV system 106 in FIG. 1. In this example, there are several EV charging stations (EVSEs) 1100 to which the EVs connect. The charging stations 1100 are controlled by a virtual (cloud-based) EMS controller 1102. The controller 1102 provides active EV metrics (e.g., EV identifier, current EV SoC) as inputs to the energy management service 1104, which service receives as inputs various information such as time of use tariffs, (kW rate, kWh rate), fleet schedule/logistics (e.g., EV arrival/departure data, target SoC). The energy management service 1102 corresponds to the predictive modeling and control optimization mechanisms described above. It outputs a charging plan (optimal kW per EVSE) that is then enforced by the EMS controller 1102. In this embodiment, the controller 1102 and management service 1104 are cloud-based and automatically optimize the charging needs for the EV infrastructure, but all within the constraints described above with respect to the site as a whole.

Preferably, the EMS controller integrates with the charging stations as a standard OCPP component, and the energy management service provides real-time charging plans that meet the fleet schedule and SoC objectives. Using the techniques of this disclosure, EV charging is appropriately managed within the context of the site as a whole, and such charging also is adaptive and adjusts for ad-hoc arrivals and time of use tariffs. The approach enables the EV subsystem to dynamically allocate charging power to reduce peak load kW.

Typically, an objective of EV charging M&V is different from M&V for buildings in the following ways. M&V for buildings has a strong dependency on outdoor temperature due to heat gain or loss. While outdoor temperature can affect an EVSEs maximum charging rate and efficiency, the outdoor temperature effect on EV charging dynamics is assumed to be negligible. Therefore, typically temperature normalization is not required. EV charging demand and energy consumption depends heavily on facility usage, which is captured by information about previous charging sessions.

According to another aspect of this disclosure, M&V for EV charging preferably involves simulating a baseline charging plan method on past charging sessions to determine what would have happened in the absence of the control techniques described herein. In the absence of a specified baseline charging plan algorithm, the following charging plan control logic can then be used to generate baselines:

At every time step, vehicles are granted capacity equal to minimum of ([max EV charging rate],[max EVSE charging rate]) in order of earliest departure time until the site's maximum capacity has been exceeded, at which point the last vehicle is granted a fraction of its maximum charging capacity. Preferably, vehicles continue to be granted capacity using this approach until their charging needs are satisfied.

Each EV is modeled using the following equation:

[state of charge 1 minute later]=[state of charge now]+[charging power over 1 minute]/[EV battery capacity]

Preferably, recorded non-EV loads are summed together with the [charging power over 1 minute] for each EVSE to determine the total baseline load behind the meter. This baseline time series load profile can be compared to the actual values found in the load_forecast table to evaluate the performance of the above-described techniques.

In a representative embodiment, the electric vehicles comprise a fleet of Class 3 or higher trucks.

Other Enabling Technologies

In one operating environment, the computing platform as described above is managed and operated "as-a-service," e.g., by a cloud-based service provider entity. This is not a requirement, however, as the platform may be supported on-premises, or in a private-public hybrid cloud. In generally, the computing platform is accessible over the publicly-routed Internet at a particular domain, or sub-domain. The platform is a securely-connected infrastructure (typically via SSL/TLS connections), and that infrastructure includes data encrypted at rest, e.g., in an encrypted database, and in transit. The computing platform typically comprises a set of applications implemented as network-accessible services. One or more applications (services) may be combined with one another. An application (service) may be implemented using a set of computing resources that are co-located or themselves distributed. Typically, an application is implemented using one or more computing systems. The computing platform (or portions thereof) may be implemented in a dedicated environment, in an on-premises manner, as a cloud-based architecture, or some hybrid. Although typically the platform is network-accessible, e.g., via the publicly-routed Internet, the computing system may be implemented in a standalone or on-premises manner. In addition, one or more of the identified components may interoperate with some other enterprise computing system or application.

One or more functions of the computing platform of this disclosure may be implemented in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

The subject matter herein can take the form of an entirely hardware embodiment, an entirely software embodiment, or an embodiment containing both hardware and software elements. In one embodiment, the functionality is implemented in software executing in one or more server machines. The disclosed system (or portions thereof) may take the form of a computer program product accessible from a computer-usable or computer-readable medium providing program code for use by or in connection with a computer or any instruction execution system. A computer-usable or computer readable medium can be any device or apparatus that can store the program for use by or in connection with the instruction execution system, apparatus, or device. The medium can be an electronic, magnetic, optical, or the like. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

While given components of the system have been described separately, one of ordinary skill will appreciate that some of the functions may be combined or shared in given instructions, program sequences, code portions, and the like.

What is claimed is described below.

What is claimed is:

1. A method to manage power distribution for a site receiving power from an electric utility grid and serving an aggregate of electric loads contained within distinct electrical subsystems, the distinct electrical subsystems being associated with a single meter and operating independently of one another such that coincident peaks for the site as a whole and as measured at the single meter are not predictable, comprising:
   for each distinct electrical subsystem, computing a grade of service (GoS) measure of a relationship between a target power requirement to service all loads within the distinct electrical subsystem and an available maximum power requirement of the distinct electrical subsystem, wherein at least one distinct electrical subsystem comprises an electric vehicle (EV) charging subsystem, the EV charging subsystem comprising a set of EV chargers at which EVs arrive and depart randomly;
   receiving the GoS measures determined for each distinct electrical subsystem;
   assessing power requirements of the distinct electrical subsystems against one another based at least in part on the GoS measures and, in response, generating an optimal power capacity limit for each distinct electrical subsystem; and
   providing each respective distinct electrical subsystem with its generated optimal power capacity limit.

2. The method as described in claim 1 wherein the generated optimal power capacity limit is provided continuously, and each respective electrical subsystem uses the generated optimal power capacity limit to optimize operation of the loads with that electrical subsystem.

3. The method as described in claim 2 further including recomputing the target power requirement to be within the generated optimal power capacity limit and generating an execution strategy such that the electrical loads within the subsystem achieve their power requirement objectives within the recomputed target power requirement.

4. The method as described in claim 1 wherein assessing power requirements of the distinct electrical subsystems based on the measures dynamically recomputes the optimal power capacity limits for the subsystems until the measure converges to a given value for all subsystems.

5. The method as described in claim 4 wherein the given value is ≤1.

6. The method as described in claim 1 further including repeating the operations continuously.

7. The method as described in claim 1 wherein, for a distinct electrical subsystem comprising fixed assets, the target power requirement is based on one or more of: weather data, market conditions, and a priority.

8. The method as described in claim 1 wherein, for a distinct electrical subsystem comprising variable and volatile assets, the target power requirement is based on one or more of: schedule and tariff data, market conditions, and a priority.

9. The method as described in claim 1 wherein a set of EVs are granted capacity equal to a minimum of a pair of values ({maximum EV charging rate}, {maximum EV Supply Equipment (EVSE) charging rate} in order of earliest departure time until a maximum capacity of the EV charging subsystem is exceeded, at which point a last EV is granted a fraction of its maximum charging capacity.

10. The method as described in claim 1 wherein the Evs comprise Class 3 or higher trucks.

11. Apparatus, comprising:
    one or more processors;
    computer memory holding computer program code executed by the one or more processors to manage power distribution for a site receiving power from an electric utility grid and serving an aggregate of electric loads contained within distinct electrical subsystems, the distinct electrical subsystems being associated with a single meter and operating independently of one another such that coincident peaks for the site as a whole and as measured at the single meter are not predictable, wherein the computer program code is configured to:
    for each distinct electrical subsystem, compute a grade of service (GoS) measure of a relationship between a target power requirement to service all loads within the distinct electrical subsystem and an available maximum power requirement of the distinct electrical subsystem, wherein at least one distinct electrical subsystem comprises an electric vehicle (EV) charging subsystem, the EV charging subsystem comprising a set of EV chargers at which EVs arrive and depart randomly;
    receive the GoS measures determined for each distinct electrical subsystem;
    assess power requirements of the distinct electrical subsystems against one another based at least in part on the GoS measures and, in response, generating an optimal power capacity limit for each distinct electrical subsystem; and
    provide each respective distinct electrical subsystem with its generated optimal power capacity limit.

12. A computer program product comprising a non-transitory computer-readable medium for use in a data processing system to manage power distribution for a site receiving power from an electric utility grid and serving an aggregate of electric loads contained within distinct electrical subsystems, the distinct electrical subsystems being associated with a single meter and operating independently of one another such that coincident peaks for the site as a whole and as measured at the single meter are not predictable, the computer program product holding computer program instructions that, when executed by the data processing system:
    for each distinct electrical subsystem, compute a grade of service (GoS) measure of a relationship between a target power requirement to service all loads within the distinct electrical subsystem and an available maximum power requirement of the distinct electrical subsystem, wherein at least one distinct electrical subsystem comprises an electric vehicle (EV) charging subsystem, the EV charging subsystem comprising a set of EV chargers at which EVs arrive and depart randomly;

receive the GoS measures determined for each distinct electrical subsystem;

assess power requirements of the distinct electrical subsystems against one another based at least in part on the GoS measures and, in response, generating an optimal power capacity limit for each distinct electrical subsystem; and provide each respective distinct electrical subsystem with its generated optimal power capacity limit.

\* \* \* \* \*